United States Patent
Tormen et al.

(10) Patent No.: US 8,786,853 B2
(45) Date of Patent: Jul. 22, 2014

(54) MONOCHROMATOR HAVING A TUNABLE GRATING

(75) Inventors: Maurizio Tormen, Corcelles (CH); Stanley Ross, Epalinges (CH); Robert Lockhart, Lausanne (CH)

(73) Assignee: CSEM Centre Suisse d'Electronique et de Microtechnique SA—Recherche et Developpement, Neuchatel (CH)

( * ) Notice: Subject to any disclaimer, the term of this patent is extended or adjusted under 35 U.S.C. 154(b) by 277 days.

(21) Appl. No.: 13/145,239

(22) PCT Filed: Jan. 22, 2010

(86) PCT No.: PCT/EP2010/050729
§ 371 (c)(1), (2), (4) Date: Aug. 25, 2011

(87) PCT Pub. No.: WO2010/084174
PCT Pub. Date: Jul. 29, 2010

(65) Prior Publication Data
US 2011/0299078 A1    Dec. 8, 2011

(30) Foreign Application Priority Data

Jan. 22, 2009 (EP) .................................. 09151155

(51) Int. Cl.
*G01J 3/28* (2006.01)
*G01J 3/40* (2006.01)
*G01J 3/18* (2006.01)

(52) U.S. Cl.
USPC ............................ 356/328; 356/305; 356/334

(58) Field of Classification Search
USPC ............... 356/305, 326–328, 334; 359/204.5, 359/207.7
See application file for complete search history.

(56) References Cited

U.S. PATENT DOCUMENTS

| 3,775,010 | A | 11/1973 | Chupp et al. |
| 4,636,074 | A * | 1/1987 | Levy et al. .................... 356/328 |
| 5,596,407 | A | 1/1997 | Zander et al. |
| 5,905,571 | A | 5/1999 | Butler et al. |
| 6,643,065 | B1 | 11/2003 | Silberman |
| 7,458,691 | B2 * | 12/2008 | Duncan ........................... 353/94 |
| 2002/0021493 | A1 | 2/2002 | Kaneko |
| 2003/0142308 | A1 * | 7/2003 | Kojima et al. ................ 356/334 |
| 2003/0231308 | A1 * | 12/2003 | Granger ....................... 356/326 |
| 2007/0019194 | A1 * | 1/2007 | Chen et al. .................... 356/328 |

(Continued)

FOREIGN PATENT DOCUMENTS

| DE | 19620807 A1 | 12/1996 |
| DE | 19708462 A1 | 8/1998 |

(Continued)

OTHER PUBLICATIONS

F. Havermeyer et al. "Volume holographic grating-based continuously tunable optical filter", Sep. 2004; Opt. Eng. 43(9) 2017-2021.*

(Continued)

*Primary Examiner* — Gregory J Toatley
*Assistant Examiner* — Hina F Ayub
(74) *Attorney, Agent, or Firm* — Young & Thompson

(57) ABSTRACT

A spectrometer includes:
an entrance aperture,
a collimator, intended to produce, from a light source, a collimated input light (5),
a plurality of gratings arranged in a 2-D matrix,
a plurality of detectors, and
an exit aperture.

32 Claims, 8 Drawing Sheets

(56) References Cited

U.S. PATENT DOCUMENTS

2007/0242268 A1* 10/2007 Dobschal et al. ............. 356/328
2008/0094626 A1    4/2008 Becker-Ross et al.
2008/0309936 A1* 12/2008 Krapu .......................... 356/328

FOREIGN PATENT DOCUMENTS

| EP | 1 365 279 A2 | 11/2003 |
| JP | 08145795 A | 6/1996 |
| WO | 2005121723 A1 | 12/2005 |
| WO | 2006077106 A1 | 7/2006 |
| WO | 2007082952 A1 | 7/2007 |
| WO | 2007089770 A2 | 8/2007 |

OTHER PUBLICATIONS

Fuss W. et al.: "A multipass grating spectrograph with a resolving power of 106", Pure and Applied Optics. Journal of the European Optical Societypart A, Institute of Physics Publishing, Bristol, GB, vol. 2, No. 4, Jul. 1, 1993, pp. 351-358, XP020071107, ISSN: 0963-9659, p. 352, figure 1.

International Search Report, dated Jul. 29, 2010, from corresponding PCT application.

European Search Report, dated Aug. 25, 2009, from corresponding European application.

* cited by examiner

MONOCHROMATOR HAVING A TUNABLE GRATING

FIELD OF THE INVENTION

The present invention relates generally to the field of spectroscopy, more particularly to the field of spectrometers comprising a plurality of gratings.

BACKGROUND OF THE INVENTION

The purpose of a spectrometer is to analyse the spectrum of an input light, by separating the narrow bands of wavelengths composing the input light.

These spectrometers could be used to analyse the spectrum of the light reflected by a sample and to obtain quantitative and/or qualitative information about this sample. By identifying and measuring the narrow bands of wavelength of the light reflected by the sample, it is possible to identify and/or quantify the chemical compounds of the sample.

For that purpose, a spectrometer generally comprises:
an entrance aperture,
an optional optic for transforming the input light into a collimated light (i.e. a light where all the rays composing it are substantially parallel),
a plurality of dispersion or diffraction devices, for producing a spectrum from the input collimated light, and
a plurality of exit apertures.

A spectrometer further comprises a light detector, for measuring the wavelengths composing the spectrum.

The dispersion device can consist in a prism, and the diffraction device can consist in a diffraction grating, working either in transmission or in reflection.

A light detector measures the intensity of the light projected onto it, and can consist for example in a photodiode.

These spectrometers can be divided in two categories:
the spectrometers measuring simultaneously each narrow band of wavelength of the spectrum, and
the spectrometers measuring sequentially each narrow band of wavelength of the spectrum.

To measure simultaneously each narrow band of wavelength, referring to the first category of spectrometer, the spectrum shall be projected onto an array of light detectors. Depending on the considered wavelength range, light detectors can be costly and power-consuming. Additionally, a trade-off between the size and the resolution of the array has to be made. Increasing the number of light detectors improves the resolution but also increases the size of the array of light detectors. The resolution is linked to the number of different narrow bands of wavelength measured, and consequently to the width of the narrowest band of wavelength that can be measured. The resolution is improved when the number of measured bands increases or when the width of the bands decreases.

Additionally, the power consumption of the array of light detectors can be high. It could be a concern when designing a handheld spectrometer.

The second category of spectrometer avoids using an array of light detectors by projecting sequentially each narrow band of wavelength onto a single light detector. It is therefore possible to measure successively the whole spectrum by using only one light detector, and consequently resulting in a compacter, less expensive and less power-consuming spectrometer.

Different solutions can be used in order to selectively project a narrow band of wavelength onto a single light detector. For example, when a diffraction grating or a prism is used to generate the spectrum, it is possible to rotate the grating or the prism. This rotation causes the direction of the spectrum to change. By adequately placing the single light detector, it is possible to project each narrow band of wavelength onto the light detector. However, this solution is difficult to implement since it requires mechanical means in order to rotate the grating. Moreover, in this configuration, it is not possible to diffract or disperse the input light more than once with a single grating.

A second solution, disclosed in document WO 2007/089770, is to project the spectrum onto a microelectromechanical system (MEMS), this MEMS being used to selectively reflect a narrow band or a band of wavelength onto a single light detector. However, this solution has the drawback to require one grating and an additional MEMS for the wavelength selection.

Another solution, disclosed in document WO/2007/082952, is to use a tunable grating. The grating is composed of a plurality of beams, each beam having a tilted reflective flat surface. The grating is stretchable, i.e. the distance between the beams is uniformly adjustable. An input collimated light is projected onto the grating, following a direction normal to the flat surfaces. This configuration, where the input light and the diffracted light are in auto-collimation is called the Littrow configuration, and is known to produce the best energetic efficiency of the diffraction. However, it has the drawback to require a circulator or a beam splitter in order to separate the refracted light from the input collimated light, in order to project only the refracted light onto the single light detector. This additional element increases the cost and the size of the system, and can also reduce the energy efficiency (i.e. reduces the intensity of the narrow bands of wavelength). Moreover, this configuration prevents to diffract the input collimated light more than once on the same active area of the diffraction grating.

The present invention proposes a spectrometer in which these drawbacks are avoided.

SUMMARY OF THE INVENTION

The present invention discloses a spectrometer comprising:
an entrance aperture,
a collimator intended to produce, from a light source, a collimated input light,
a plurality of gratings,
an exit aperture and
a plurality of detectors.

The gratings are tunable and arranged to from a 2D-matrix to diffract the collimated input light. A 2D-matrix of gratings comprises at least two gratings disposed in n rows and m columns where n and m are positive integers different from 0. Each of said gratings produces a distinct collimated beam with a narrow band of wavelength. Each of the detectors is associated with one grating among the plurality of gratings. Each of the detectors is arranged to measure the intensity of the distinct collimated beam with a narrow band of wavelength produced by its associated grating.

The present invention also concerns a spectrometer comprising:
an entrance aperture,
a collimator, producing, from a light source, a collimated input light, a grating, said grating being arranged to diffract said collimated input light,
a first mirror and a second mirror,
an exit aperture, and
at least a detector.

The collimated input light is arranged to be parallel to a plane P1 parallel to the longitudinal axis of each of the beams and perpendicular to the first tilted reflective flat surfaces. The collimated input light is diffracted by the grating into a first collimated beam with a narrow band of wavelength. A first mirror and a second mirror are arranged in order for the first collimated beam with a narrow band of wavelength to be parallel to a plane P2 after reflection on the second mirror. This plane P2 is parallel to the longitudinal axis of each of the beams and perpendicular to the second tilted reflective flat surface. The first collimated beam with a narrow band of wavelength is diffracted by the grating into a second collimated beam with a narrow band of wavelength. The detector is arranged to measure the intensity of the second collimated beam with a narrow band of wavelength produced by the grating.

BRIEF DESCRIPTION OF THE DRAWINGS

The above and other objects, features and advantages of the present invention will become further apparent from the following description of the preferred embodiment taken in conjunction with the accompanying drawings, in which.

DETAILED DESCRIPTION

Figure 1A:
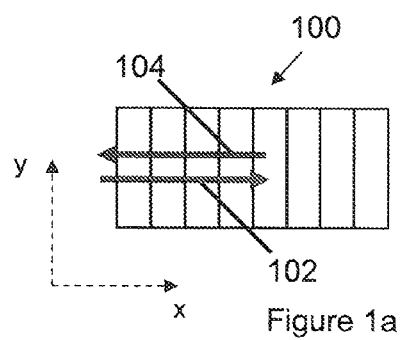
FIGS. 1a, 1b and 1c are 3D-views of a grating used within standard Littrow condition.
Figure 1B:
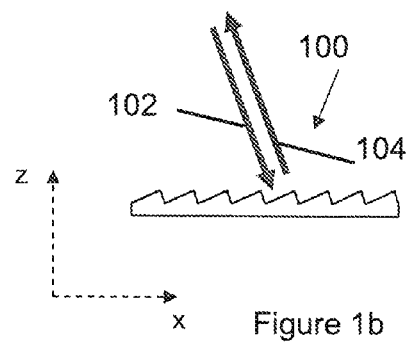
Figure 1C:
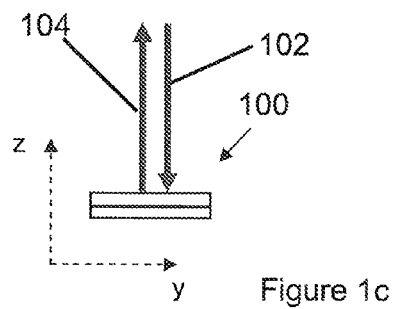

FIGS. 1a, 1b and 1c depict a blazed grating 100 seen from above in plane x-y, and from a first side according to plane x-z and a second side according to plane y-z. These figures defined the standard Littrow condition where the incident collimated input light 102 is arranged to be normal to the grating reflecting surfaces. Therefore, the refracted output collimated light 104 is also normal to the reflecting surfaces. On one hand, the highest efficiency is obtained. On the other hand, the collimated input and output lights are in autocollimation and require an optical element such as a beamsplitter to separate them.

Figure 2A:
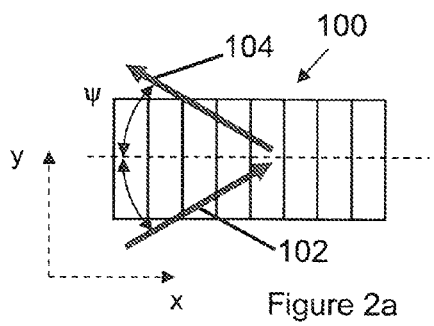
FIGS. 2a, 2b and 2c are 3D-views of a grating used within generalized Littrow condition.
Figure 2B:
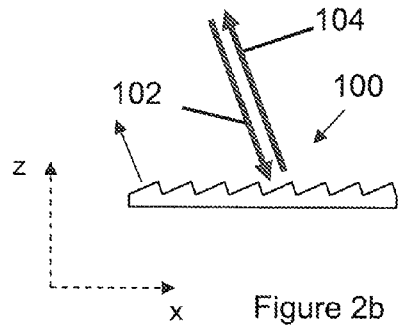
Figure 2C:
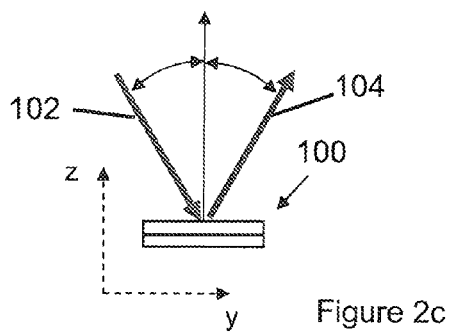

One aspect of the invention is to retain a high efficiency while removing the additional optical element. This is achieved with a generalized Littrow condition as shown in FIGS. 2a, 2b and 2c. These figures depict a blazed grating 100 seen from above in plane x-y, and from a first side according to plane x-z and a second side according to plane y-z. The incident collimated input light 102 is arranged to be parallel to a plane P (not shown in the figure) normal to the grating reflecting surface so that the refracted output collimated light 104 is also parallel to the same plane P as shown in FIGS. 2a, 2b and 2c. The angle between the collimated input light and the normal to the reflective flat surfaces is different from 0°.

FIG. 3 depicts a spectrometer 1 according to a first preferred embodiment of the present invention.

The spectrometer 1 comprises:
an entrance aperture, not represented,
a tunable step grating 2,
an exit aperture not represented on the figure, located between the plurality of gratings and a plurality of detectors, and
a plurality of detectors (where detector 3 is solely represented).

The entrance aperture, the tunable step grating 2 and the exit aperture act as a monochromator.

The step grating 2 comprises a plurality of elongated beams 4 arranged parallel to each other along an axis x. The longitudinal axis of each beam is perpendicular to the axis x.

The top of each beam forms a reflective flat surface 4a. The plurality of flat surfaces 4a defines planes arranged to be parallel and spaced by a distance d1. This distance d1 is tunable.

The collimator is arranged so that the collimated input light 5 is parallel to a plane a P. This plane P is parallel to the longitudinal axis of the elongated beams and perpendicular to the reflective flat surfaces 4a. The angle α between the collimated input light 5 and the normal to the reflective flat surfaces 4a is different from 0° in compliance with the generalized Littrow condition. Preferably, the angle α shall be within the range [10°; 70°]. More preferably, the angle α shall be within the range [20°; 60°].

When projecting the input collimated light 5 on the plurality of reflective flat surfaces 4a, the combination of the light reflected by each reflective flat surface 4a produces a diffraction of the input collimated light 5, the diffraction being represented as a spectrum 6.

On FIG. 3, only a few narrow bands of wavelength, 6a, 6b and 6c are represented.

Thanks to the orientation of the input collimated light 5, as described above, only one narrow band of wavelength belongs to the plane P. Referring to FIG. 3, only the narrow band of wavelength 6b belongs to the plane P, the narrow bands of wavelength 6a and 6c being out of the plane P. It has to be mentioned that FIG. 3 represents only one narrow band of wavelength 6b, but actually it has to be considered as a plurality of collimated beam with a narrow band of wavelength.

The light detector 3 can be a photodiode. It is disposed such as to collect the light diffracted parallel to the plane P. Consequently, the single light detector will only measure the intensity of the narrow band of wavelength that is parallel to the plane P, 6b for FIG. 3.

Figure 3A:
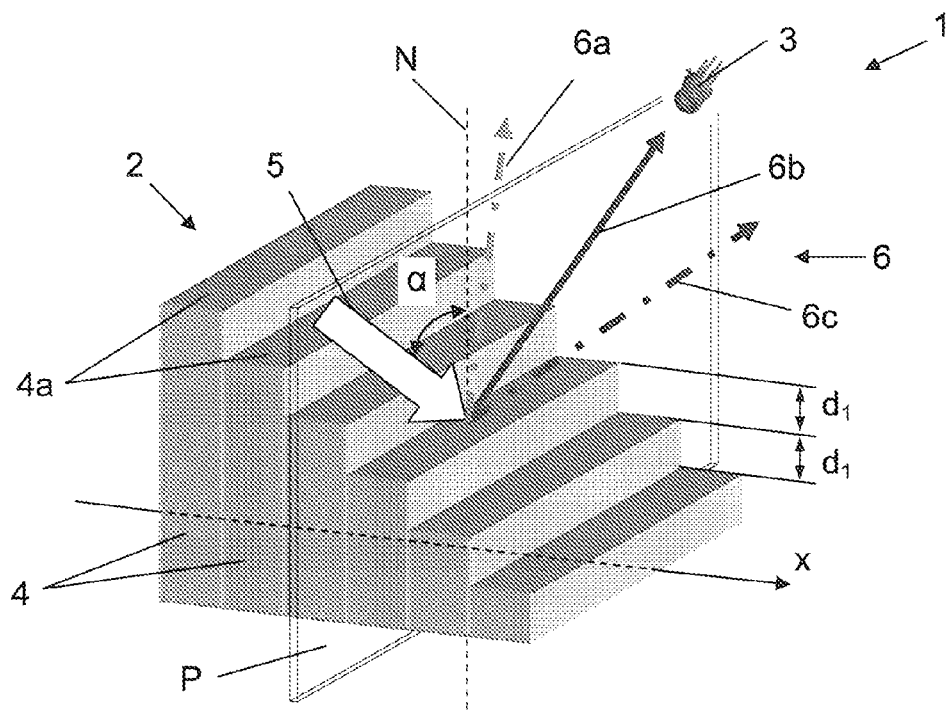
FIGS. 3a and 3b are 3D-views of a first embodiment of a spectrometer according to the present invention, where a collimated input light is diffracted by a grating and measured by a detector.
Figure 3B:
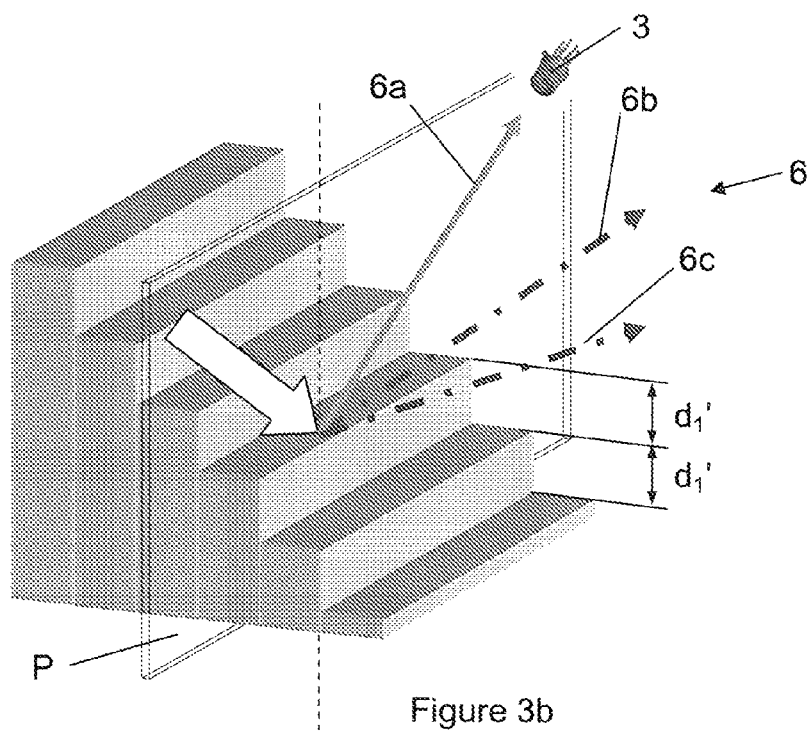

FIG. 3b depicts the same spectrometer as in FIG. 3a wherein the reflective flat surfaces 4a are spaced by a distance $d_1'$, with $d_1'>d_1$. The orientation of the spectrum is modified, and a different narrow band of wavelength 6a is projected onto the light detector 3.

By setting successively different values for the distance d, and measuring the intensity of the light projected onto the light detector 3, the spectrum characteristics are sequentially obtained, i.e. the intensity of the wavelengths composing the input collimated light 5.

The orientation of the input collimated light 5 gives two main advantages.

The input collimated light and the diffracted light have a separate path. Consequently, there is no need for a circulator or a beam splitter, in opposition to a spectrometer implementing the standard Littrow configuration, where the input light and the diffracted light are in auto-collimation.

When the distance $d_1$ is modified, only the diffracted spectrum moves, but the direction of the reflected light is not modified. The light projected parallel to the plane P is always collimated and corresponds to a given band of wavelength. Collecting and measuring such a collimated light is therefore efficient.

Another advantage will be more apparent below.

The grating 5 can also consist in a blazed grating, comprising a plurality of tilted parallel flat surfaces. For example, the tunable blazed grating disclosed in document WO/2007/082952 is suitable. The collimated input light is projected onto the flat surfaces in the same way as described in reference to FIGS. 1a and 1b, leading to the same advantages.

Figure 4:
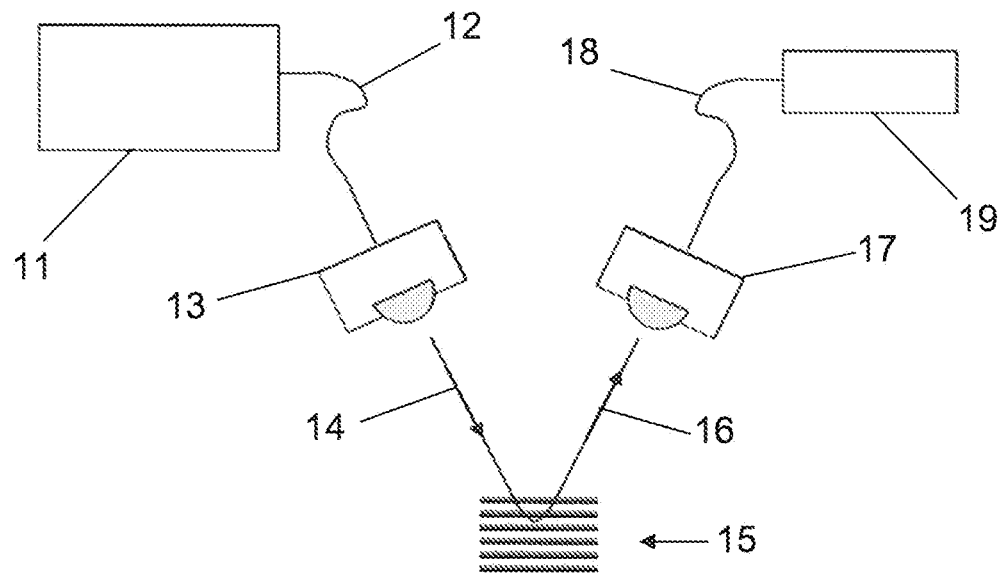
FIG. 4 presents a top view of a spectrometer according to another embodiment of the present invention.

FIG. 4 depicts another embodiment of the present invention, which is a variation of the system described in FIG. 3, providing the same advantages. A light source 11 produces a light, the spectrum of which is to be analysed. The light from the light source 11 is distributed to a collimator 13 using an optical fibre 12. The collimator transforms the light distributed by the optical fibre 12 into a collimated light 14. The collimated light 14 is projected onto a tunable grating 15, using the configuration described in FIG. 3. A collimated beam with a narrow band of wavelength 16 is produced by the grating 15. A collimator 17 collects the collimated light 16 and distributes it to a detector 19, using an optical fibre 18. The narrow band of wavelength collected by the collimator 17 depends on the value of the distance $d_1$ between two consecutive flat surfaces of the grating 15. The spectrum of the light source 11 is measured sequentially by setting successively different values for the distance $d_1$ of the grating 15, and by measuring the intensity of the light projected onto the detector 19.

Figure 5:
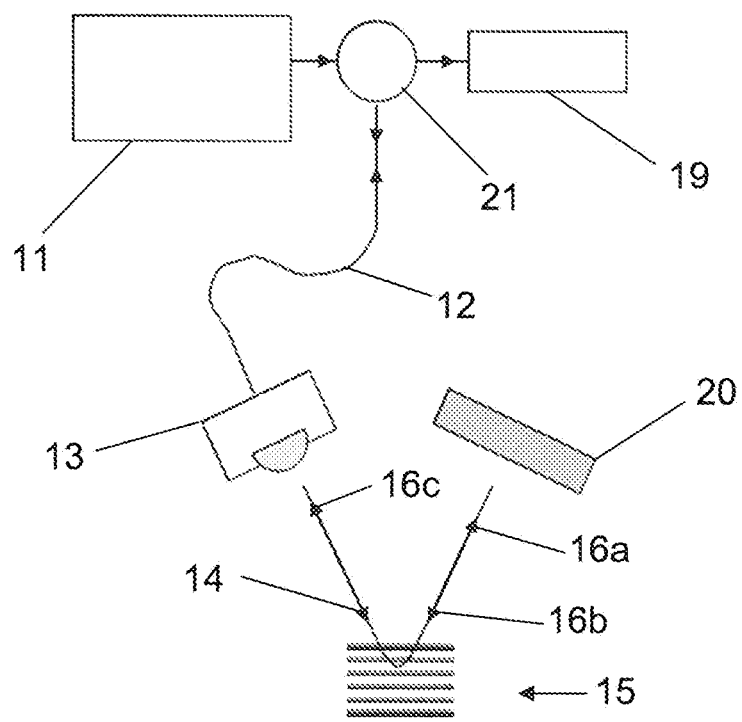
FIG. 5 presents a top view of a spectrometer according to another embodiment of the present invention, where the collimated input light is diffracted twice on the same grating.

FIG. 5 depicts another embodiment of the present invention. Similarly to the spectrometer of FIG. 4, a light source 11 produces a light the spectrum of which is to be analysed. The light source is distributed to the collimator 13 using a circulator 21 and a fibre 12. A collimated light 14 is projected onto the tunable grating 15, using the configuration described in FIG. 3. A first collimated beam with a narrow band of wavelength 16a is produced by the grating 15. A single mirror 20, being arranged such as his reflective surface is normal to the first collimated beam with a narrow band of wavelength 16a, reflects back the first collimated beam with a narrow band of wavelength 16a in the direction 16b. The first collimated beam with a narrow band of wavelength 16a is projected again onto the grating 15, producing a second narrow band of wavelength 16c, in a direction opposite to the collimated light 14. The second narrow band of wavelength 16c is collected by the collimator 13, and distributed to a detector 19, through the fibre 12 and the circulator 21. The spectrum of the light source 11 is measured sequentially by setting successively different values for the distance $d_1$ of the grating 15, and measuring the intensity of the light projected onto the detector 19.

The circulator 21 is implemented in order to distribute the light from the source 11 to the collimator 13, and to distribute the light from the collimator 13 to the detector 19.

Thanks to the present invention, and particularly thanks to the orientation of the collimated input light according to the generalized Littrow condition, the collimated input light is diffracted twice by simply adding a mirror. In the standard Littrow condition, the input light would only be diffracted once.

Projecting a first time a collimated light onto a grating selects a first narrow band of wavelength. Projecting this first narrow band of wavelength a second time selects a narrower band of wavelength. The resolution of the spectrometer is consequently improved (because the width of the narrowest band of wavelength the intensity of which is measured is reduced).

Figure 6:
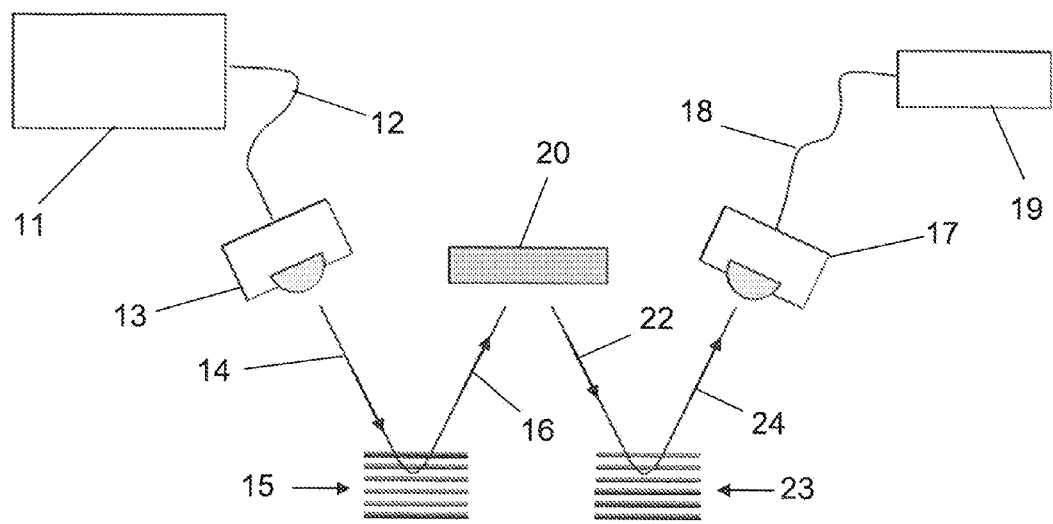
FIG. 6 presents a top view of a spectrometer according to another embodiment of the present invention, where the collimated input light is consecutively diffracted once by two different gratings.

FIG. 6 describes another embodiment of the present invention involving a first grating and a second grating forming a pair of gratings.

Similarly to the system described in FIG. 3, a collimated light 14 is projected onto a first tunable grating 15, according to the generalized Littrow condition. A first collimated beam with a narrow band of wavelength 16 is produced by the first grating 15. The first narrow band of wavelength 16 is reflected by a mirror 20, in the direction of a second grating 23, using the configuration described in FIG. 3. The second grating 23 is also tunable, the distance between two consecutive reflective flat surfaces being called $d_2$. A second collimated beam with a narrow band of wavelength 24 is produced by the grating 23. A collimator 17 collects the collimated light 16 and distributes it to a detector 19, using an optical fibre 18.

The setting environment described on FIG. 6, can be used in two grating configurations:

the distance $d_1$ of the grating 15 and the distance $d_2$ of the grating 23 are equal, or the distance $d_1$ of the grating 15 and the distance $d_2$ of the grating 23 are different.

When the distance $d_1$ of the grating 15 and the distance $d_2$ of the grating 23 are equal, the same advantages than the configuration of FIG. 5 are provided, i.e. when the input light beam is diffracted twice on the same grating. The resolution of the spectrometer is improved. Moreover, using this configuration, there is no need to use a circulator.

When the distance $d_1$ of the gratings 15 and the distance $d_2$ of the grating 23 are different, the periodicity of the spectral response of the grating 15 is different from the periodicity of the spectral response of the grating 23. A grating has a periodic spectral response, being composed of a plurality of periodic peaks. In some applications, some peaks are undesirable, and it could be an objective to suppress (or at least drastically reduce) some peaks. For example, when two peaks are adjacent, one of the peaks may mask a lower peak of interest (i.e. it may be difficult to measure one peak close to a higher peak).

Figure 7A:
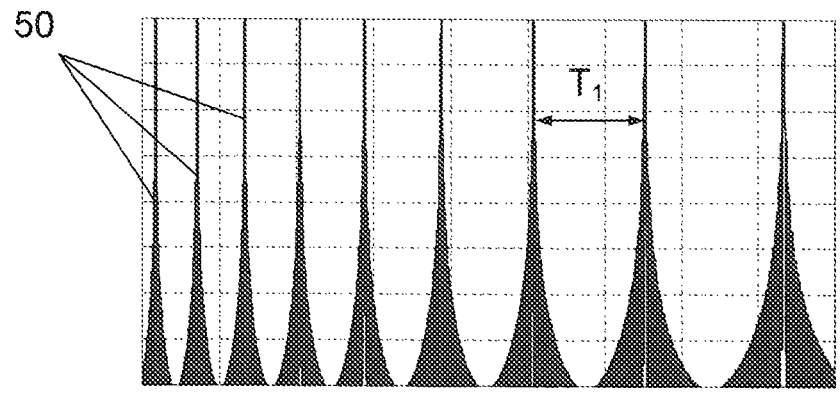
FIGS. 7a and 7b show the spectral response of two different gratings.
Figure 7B:
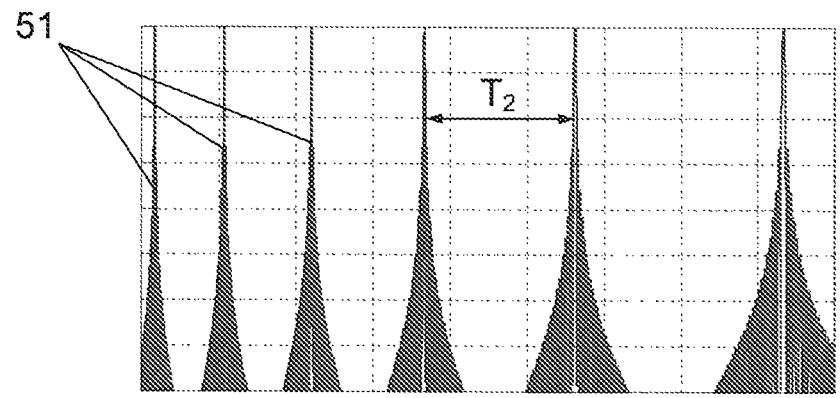

An example of the spectral response of the grating 15 is represented by the peaks 50 of FIG. 7a, the peaks 50 having a periodicity $T_1$. An example of the spectral response of the grating 23 is represented on FIG. 7b, referring to the peaks 51, the peaks 51 having a periodicity $T_2$, $T_2$ being greater than $T_1$.

Figure 7C:
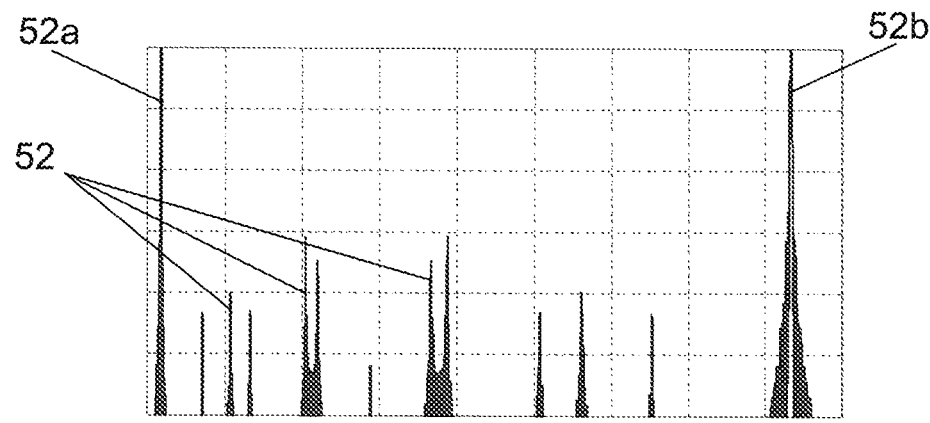
FIG. 7c shows the spectral response of the successive diffraction by the gratings whose spectral response is presented on FIGS. 7a and 7b.

The spectral response of the two gratings (i.e. the spectral response resulting from the successive use of the two gratings) is obtained by multiplying the spectral response of the grating 50 by the spectral response, and the result is given on FIG. 7c. The spectral response of the two gratings is also composed of a plurality of peaks 52, but the amplitude of all the peaks between peaks 52a and 52b have been highly reduced. According to this embodiment, two wavelengths, corresponding to the peaks 52a and 52b, have been selected. By setting separately the periodicity of each grating (i.e. by setting separately the distance $d_1$ and the distance $d_2$), it is possible to suppress or highly reduce some peaks of the spectral response within a high range of tunability.

By making minor changes (replacing the collimator 17 by a mirror having the same orientation as in FIG. 5, and implementing a circulator and the detector as in FIG. 5), it is possible to diffract again the input light 14 twice on each grating 15 and 23, and improves the resolution of the spectrometer. This improvement is suitable for both configurations described above ($d_1=d_2$ or $d_1 \neq d_2$).

Figure 8A:
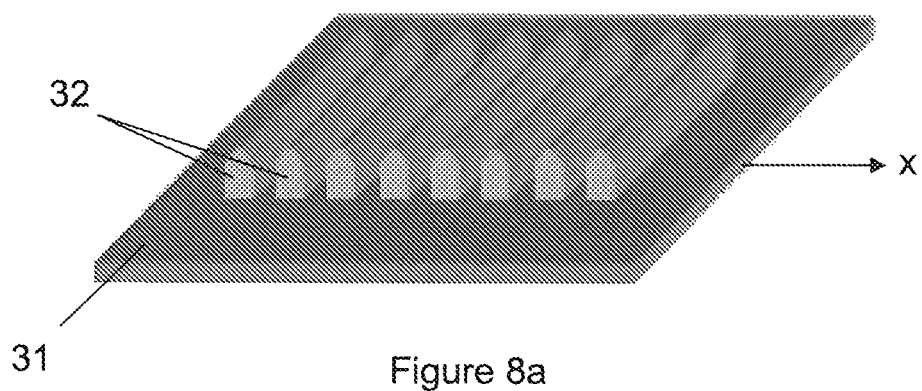
FIG. 8a is a 3-D view of a double-sided grating, FIG. 8b being a lateral view of the same double-sided grating.
Figure 8B:
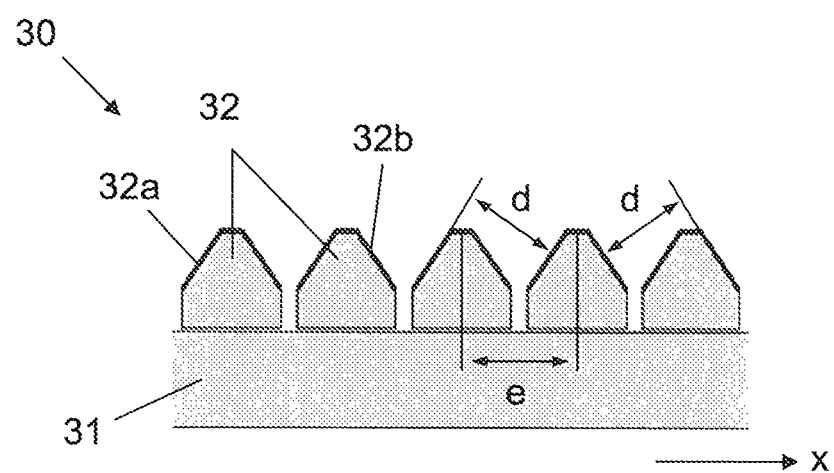

FIG. 8 represents a double-sided tunable grating 30. The grating 30 comprises a plurality of parallel elongated beams 32, lying on a substrate 31. The beams are disposed along an axis x, the longitudinal axis of each beam being perpendicular to the axis x. Two consecutive beams 32 are separated by a distance e in the direction of the axis x.

According to the present invention, the top of each beam 32 comprises, on a first longitudinal side, a first tilted reflective flat surface 32a, and on the second longitudinal side, a second tilted reflective flat surface 32b.

The flat surfaces 32a of two consecutive beams 32 are parallel and are separated by a distance d in the direction of the normal of the flat surfaces 32a. In the same way, the flat surfaces 32b of two consecutive beams 32 are parallel and are separated by the distance d in the direction of the normal of the flat surfaces 32b.

Additionally, the grating 30 is stretchable, i.e. the distance e between two consecutive beams can be uniformly modified, modifying consequently the distance d between two consecutive flat surfaces.

The double-sided tunable grating 30 can be made using known micro fabrication techniques.

Figure 9:
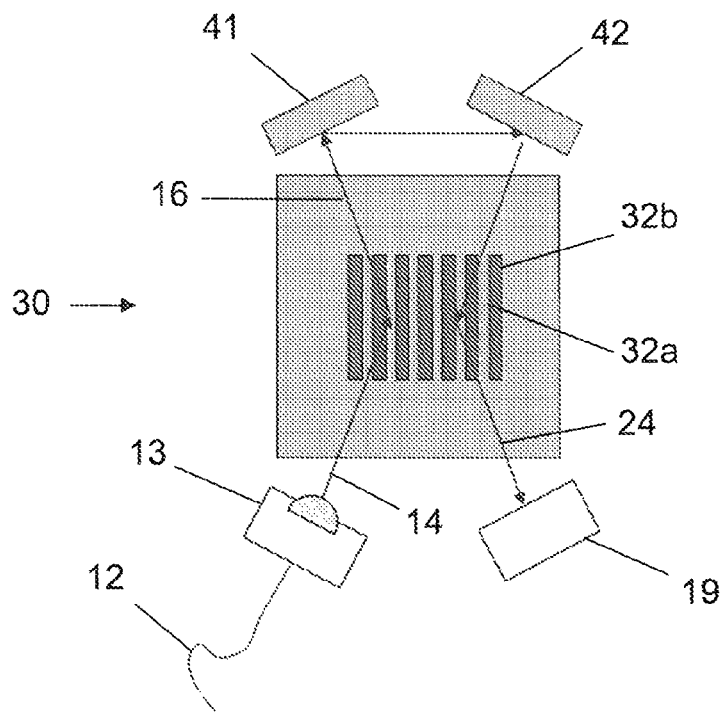
FIG. 9 is a top view of a spectrometer using the double-sided grating.

The double-sided tunable grating 30 of FIG. 8 is advantageously used in a monochromator according to FIG. 9 for further use in a spectrometer for instance. The monochromator comprises an entrance aperture, a collimator 13 intended to produce, from a light source, a collimated input light 14, a double-sided tunable grating 30 and an exit aperture. The collimated input light 14 is projected onto the flat surfaces 32a of the grating 30 according to the generalized Littrow condition. A first collimated beam with a narrow band of wavelength 16 is produced by the grating 30. The first collimated beam with a narrow band of wavelength 16 is reflected by a first mirror 41 and by a second mirror 42, and projected onto the flat surfaces 32b of the grating 30, still using the orientation described on FIG. 3. A second collimated beam with a narrow band of wavelength 24 is produced by the grating 30. The second collimated beam with a narrow band of wavelength 24 is then collected and measured by the detector 19. The spectrum of the light source 11 is measured sequentially by setting successively different values for the distance d of the grating 30, and measuring the intensity of the light projected onto the detector 19.

In this embodiment, the collimated input light 14 is diffracted twice by the grating, providing the same improvement of the resolution as for the system of FIG. 5.

Figure 10:
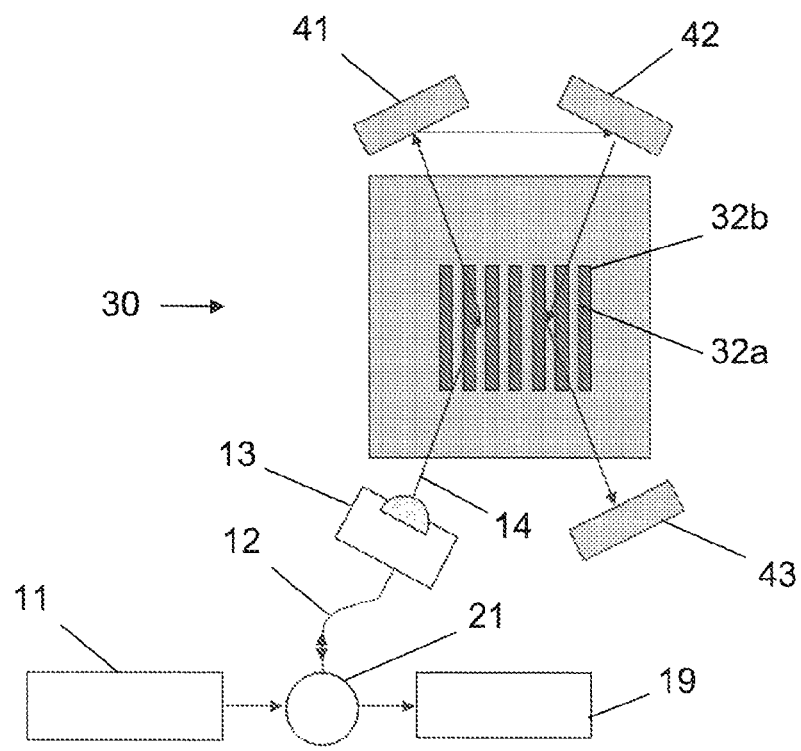
FIG. 10 is a top view of another embodiment of the spectrometer using the double-sided grating.

Another embodiment of the present invention is presented in FIG. 10. The input collimated light 14 is projected onto the flat surfaces 32a of a double-sided grating 30, according to the generalized Littrow condition. More precisely, the collimated input light 14 is arranged to be parallel to a plane P1 which is parallel to the longitudinal axis of each of said beams 32 and perpendicular to the first tilted reflective flat surfaces 32a. A first collimated beam with a narrow band of wavelength is produced by the grating 30 and successively reflected by a first mirror 41, a second mirror 42, and projected onto the flat surfaces 32b of the grating 30, according to the generalized Littrow condition. More precisely, after the reflection on the second mirror 42, the first collimated beam with a narrow band of wavelength is arranged to be parallel to a plane P2 which is parallel to the longitudinal axis of the beams 32 and perpendicular to the second tilted reflective flat surfaces 32b. A second collimated beam with a narrow band of wavelength is produced by the grating 30. The second collimated beam with a narrow band of wavelength is then reflected back by a third mirror 43, the mirror being arranged such as his reflective surface is normal to the second collimated beam with a narrow band of wavelength. The third mirror 43 projects the second collimated beam with a narrow band of wavelength onto the flat surfaces 32b of the grating 30, producing a third collimated beam with a narrow band of wavelength, which is reflected by the second mirror 42 and by the first mirror 41. The third collimated beam with a narrow band of wavelength is projected again onto the flat surfaces 32a of the grating 30, producing a fourth collimated beam with a narrow band of wavelength. The fourth collimated beam with a narrow band of wavelength is collected by the collimator 13, and distributed to a detector 19, through the fibre 12 and the circulator 21. The spectrum of the light source 11 is measured sequentially by setting successively different values for the distance d of the grating 30, and measuring the intensity of the light projected onto the detector 19.

In this embodiment, the collimated input light is diffracted four times using the same grating. In such a configuration, the resolution of such a spectrometer can be very high thanks to the four successive diffractions, but requires only a few additional equipments (three mirrors), compared to a spectrometer using the standard Littrow condition, performing only one diffraction of the input light.

Figure 11:
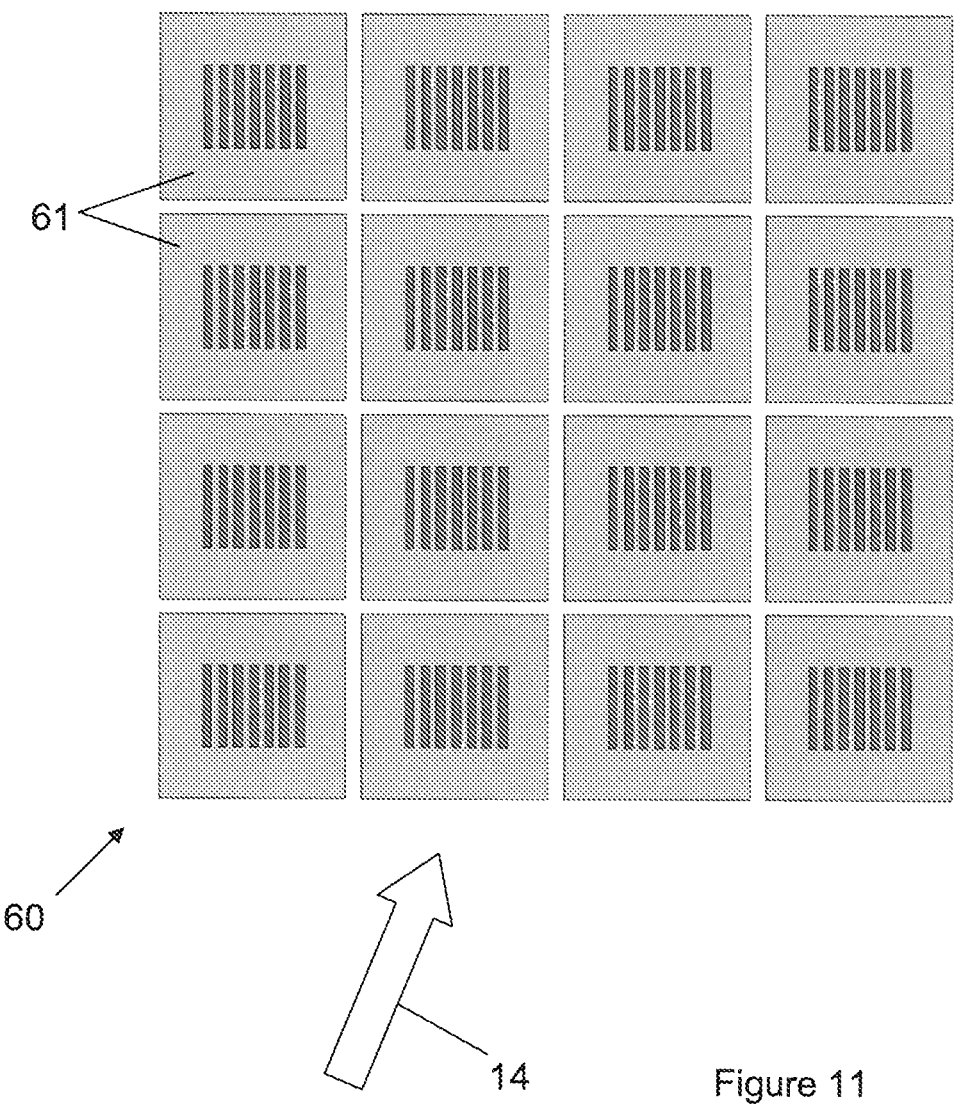
FIG. 11 is a top view of a spectrometer implementing a 2-D matrix of gratings.

FIG. 11 depicts another embodiment of the present invention. The spectrometer consists in a plurality of spectrometers 61, disposed in a 2D-matrix 60. Each spectrometer 61 comprises at least a grating and a detector, the grating being of any above-mentioned type (step, blazed or doubly-blazed) and being tunable or not.

Each grating has a different distance d. The input collimated light 14 is projected simultaneously onto each spectrometer 61 of the 2D-matrix 60, respecting the configuration described on FIG. 3. The detector of each spectrometer 61 (not represented on the figure) measures the intensity of the narrow band of wavelength produced by each grating. Thanks to the orientation described in FIG. 3, the detectors can easily be disposed in such a way that it collects only the narrow band of wavelength produced by its corresponding grating without preventing the measurement of the other narrow bands of wavelength produced by the other gratings.

In this embodiment, the spectrum is measured in parallel, reducing the time required to get the entire spectrum. If the grating of each spectrometer 61 is not tunable, the whole spectrum is measured simultaneously, each spectrometer 61 measuring a given wavelength. The resolution of such a spectrometer is limited to the number of spectrometers 61 in the matrix 60.

If the grating of each spectrometer 61 is tunable, each spectrometer 61 measures a set of wavelength. The measurement of the spectrum is both sequential and parallel, reducing the measurement time but giving a good resolution.

Of course, it is possible to implement, for the array, the configurations described in FIG. 3 or 7, in order to diffract twice or four times the collimated input light onto the same grating.

The mirrors used to project again the light onto a grating could also be concave in order to re-collimate the light before diffracting it again.

In another embodiment according to the invention, a spectrometer could furthermore comprise a dispersive element arranged between at least one grating and at least one detector to separate the spatially overlapping spectra of the diffracted collimated output light produced by the grating before falling onto the detector.

The diffracted collimated output light produced by the grating is actually composed of many replicated spectra, each individual spectrum being of a different integral order. In the general case, the individual spectra spatially overlap each other on the detectors. For example, the blue line in the second order-spectrum may overlap with the red portion of the first-order spectrum. This is a significant drawback. It is therefore desirable to analyze a single spectrum by itself without interference from spectra of different orders.

In one embodiment, the dispersive element is a prism. It is arranged to displace the higher order spectra so far beyond the first order so that they do not fall upon the plurality of detectors and only the first order is detected.

In another embodiment, the dispersive element is arranged to displace the spectra away from each other so that they do not overlap. The plurality of detectors can be further arranged to form a line or a 2D matrix of detectors. This 2D matrix forms an array of detectors arranged so that each row corresponds to a spectrum of interest to be read and analyzed. A 2D matrix of detectors could also be form of a single row.

The preceding description is provided as non-limiting examples and one skilled in the art will be able to implement some variations of embodiment without going outside the scope of the present invention.

The invention claimed is:

1. A spectrometer, comprising:
an entrance aperture;
a collimator intended to produce, from a light source, a collimated input light;
a plurality of gratings;
an exit aperture; and
a plurality of detectors,
wherein said gratings are tunable and arranged to form a 2D-matrix to diffract said collimated input light, each of said gratings producing a distinct collimated beam with a narrow band of wavelength and each single individual one of said detectors being associated with one corresponding single individual grating of said plurality of gratings and arranged to measure the intensity of said distinct collimated beam with a narrow band of wavelength produced by said grating.

2. The spectrometer of claim 1,
wherein each grating of said plurality of gratings comprises a plurality of elongated beams being arranged parallel to each other along an axis x,
the longitudinal axis of each of said beams being perpendicular to the axis x and the top of each beam forming a reflective flat surface, and the plurality of reflective flat surfaces defining planes arranged to be parallel and spaced by a distance $d_1$, said distance $d_1$ being tunable, and
wherein said collimator is arranged for the collimated input light to be parallel to a plane P, said plane P being parallel to the longitudinal axis of the elongated beams and perpendicular to said reflective flat surfaces and the angle $\alpha$ between said collimated input light and the normal to the reflective flat surfaces being different from 0°.

3. The spectrometer of claim 2, further comprising:
a plurality of optical fibres arranged in order to output the diffracted light diffracted by each of said gratings.

4. The spectrometer of claim 2, wherein said angle $\alpha$ is within the range [10°; 70°].

5. The spectrometer of claim 3, wherein said angle $\alpha$ is within the range [10'; 70°].

6. The spectrometer of claim 2, wherein said plurality of gratings is a plurality of step gratings.

7. The spectrometer of claim 3, wherein said plurality of gratings is a plurality of step gratings.

8. The spectrometer of claim 4, wherein said plurality of gratings is a plurality of step gratings.

9. The spectrometer of claim 5, wherein said plurality of gratings is a plurality of step gratings.

10. The spectrometer of claim 2, wherein said plurality of gratings is a plurality of blazed gratings.

11. The spectrometer of claim 3, wherein said plurality of gratings is a plurality of blazed gratings.

12. The spectrometer of claim 4, wherein said plurality of gratings is a plurality of blazed gratings.

13. The spectrometer of claim 5, wherein said plurality of gratings is a plurality of blazed gratings.

14. The spectrometer of claim 2, wherein each grating of said plurality of gratings comprises a first mirror intended to reflect back a first collimated beam with a narrow band of wavelength produced by said grating, the normal of said first mirror being parallel to said first collimated beam with a narrow band of wavelength,
said grating diffracting again said first collimated beam with a narrow band of wavelength into a second collimated beam with a narrow band of wavelength, and said detector being arranged in order to measure the intensity of said second collimated beam with a narrow band of wavelength.

15. The spectrometer of claim 2,
wherein said gratings are arranged in a plurality of pairs of gratings, each pair associating a first grating and a second grating,
said pair further comprising a first mirror reflecting a first collimated beam with a narrow band of wavelength produced by said first grating onto said second grating,
said second grating having reflective flat surfaces defining planes arranged to be parallel and spaced by a distance $d_2$, producing a second collimated beam with a narrow band of wavelength, and
wherein said pair is furthermore associated with a detector arranged to measure the intensity of said second collimated beam with a narrow band of wavelength.

16. The spectrometer of claim 15, wherein each pair of gratings furthermore comprises a second mirror reflecting back the second collimated beam with a narrow band of wavelength, the normal of said second mirror being parallel to the second collimated beam with a narrow band of wavelength, said pair of gratings diffracting said second collimated beam with a narrow band of wavelength after reflection on the second mirror.

17. The spectrometer of claim 15, wherein the distance $d_1$ between two consecutive flat surfaces of the first grating is equal to the distance $d_2$ between two consecutive flat surfaces of the second grating.

18. The spectrometer of claim 16, wherein the distance $d_1$ between two consecutive flat surfaces of the first grating is equal to the distance $d_2$ between two consecutive flat surfaces of the second grating.

19. The spectrometer of claim 15, wherein the distance $d_1$ between two consecutive flat surfaces of the first grating is different from the distance $d_2$ between two consecutive flat surfaces of the grating.

20. The spectrometer of claim 16, wherein the distance $d_1$ between two consecutive flat surfaces of the first grating is different from the distance $d_2$ between two consecutive flat surfaces of the grating.

21. The spectrometer of claim 1, further comprising:

a first mirror and a second mirror, wherein each grating of said plurality of gratings comprises a plurality of elongated beams placed on a substrate, said elongated beams being arranged parallel to each other along an axis x, the longitudinal axis of each of said beams being perpendicular to the axis x and the distances e between two consecutive beams in the direction of x being equal and tunable, wherein the top of each beam comprises on a first longitudinal side, a first tilted reflective flat surface parallel to each first tilted surface of said elongated beams, and, on a second longitudinal side, a second tilted reflective flat surface, parallel to each second tilted surface of said elongated beams, wherein collimated input light is arranged to be parallel to a first plane, said first plane being parallel to the longitudinal axis of each of said beams and perpendicular to the first tilted reflective flat surfaces, said collimated input light being diffracted by said grating into a first collimated beam with a narrow band of wavelength, and wherein said first mirror and second mirror, are arranged in order for said first collimated beam with a narrow band of wavelength to be parallel to a second plane after reflection on the second mirror, said second plane being parallel to the longitudinal axis of each of said beams and perpendicular to the second tilted reflective flat surfaces, said first collimated beam with a narrow band of wavelength being diffracted by said grating into a second collimated beam with a narrow band of wavelength.

22. The spectrometer of claim 21, further comprising:

a third mirror, said third mirror reflecting back the second collimated beam with a narrow band of wavelength, the normal of said third flat mirror being parallel to said second collimated beam with a narrow band of wavelength.

23. A monochromator comprising:

an entrance aperture;

a collimator, intended to produce, from a light source, a collimated input light;

a grating comprising a plurality of elongated beams placed on a substrate, said elongated beams being arranged parallel to each other along an axis x, the longitudinal axis of each of said beams being perpendicular to the axis x and the distances e between two consecutive beams in the direction of x being equal and tunable;

an exit aperture; and a first mirror and a second mirror, wherein the top of each elongated beam comprises on a first longitudinal side, a first tilted reflective flat surface parallel to each first tilted surface of said elongated beams, and, on a second longitudinal side, a second tilted reflective flat surface, parallel to each second tilted surface of said elongated beams, and wherein said collimated input light is arranged to be parallel to a first plane, said first plane being oriented parallel to the longitudinal axis of each of said beams and perpendicular to the first tilted reflective flat surfaces, said collimated input light being diffracted by said grating into a first collimated beam with a narrow band of wavelength, and wherein said first mirror and second mirror, are arranged in order for said first collimated beam with a narrow band of wavelength to be parallel to a second plane after reflection on the second mirror, said second plane being parallel to the longitudinal axis of each of said beams and perpendicular to the second tilted reflective flat surfaces, said first collimated beam with a narrow band of wavelength being diffracted by said grating into a second collimated beam with a narrow band of wavelength, and wherein said detector is arranged to measure the intensity of the second collimated beam with a narrow band of wavelength produced by said grating.

24. A spectrometer, comprising:

a monochromator according to claim 23;

a detector; and a third flat mirror, said third flat mirror reflecting back the second collimated beam with a narrow band of wavelength, the normal of said third flat mirror being parallel to said second collimated beam with a narrow band of wavelength.

25. The spectrometer of claim 1, further comprising:

a dispersive element arranged to separate spatially overlapping spectra of a diffracted collimated output light produced by at least one grating before said output light falls onto at least one detector.

26. The spectrometer of claim 25, wherein each grating of said plurality of gratings comprises a first mirror intended to reflect back a first collimated beam with a narrow band of wavelength produced by said grating, the normal of said first mirror being parallel to said first collimated beam with a narrow band of wavelength, said grating diffracting again said first collimated beam with a narrow band of wavelength into a second collimated beam with a narrow band of wavelength, and said detector being arranged in order to measure the intensity of said second collimated beam with a narrow band of wavelength.

27. The spectrometer of claim 25, wherein said gratings are arranged in a plurality of pairs of gratings, each pair associating a first grating and a second grating, said pair further comprising a first mirror reflecting a first collimated beam with a narrow band of wavelength produced by said first grating onto said second grating, said second grating having reflective flat surfaces defining planes arranged to be parallel and spaced by a distance $d_2$, producing a second collimated beam with a narrow band of wavelength, and in that said pair is furthermore associated with a detector arranged to measure the intensity of said second collimated beam with a narrow band of wavelength.

28. The spectrometer of claim 25, wherein said dispersive element is a prism.

29. The spectrometer of claim 26, wherein said dispersive element is a prism.

30. The spectrometer of claim 27, wherein said dispersive element is a prism.

31. The spectrometer of claim 25, comprising a plurality of detectors arranged to form a 2D matrix of detectors.

32. The spectrometer of claim 26, comprising a plurality of detectors arranged to form a 2D matrix of detectors.

* * * * *